UNITED STATES PATENT OFFICE.

HORACE VAUGHN, OF PROVIDENCE, RHODE ISLAND, AND W. HUTTON, OF BALTIMORE, MARYLAND, ASSIGNORS TO HORACE VAUGHN.

IMPROVEMENT IN LUBRICATING COMPOUNDS.

Specification forming part of Letters Patent No. 24,965, dated August 2, 1859.

*To all whom it may concern:*

Be it known that we, HORACE VAUGHN, of Providence, Rhode Island, and WILLIAM HUTTON, of Baltimore, Maryland, have invented the Cooling Compound Solution, a new and improved compound for cooling machinery, and for preventing the journals of the same from heating or cutting, and for lubricating at the same time, also for greasing wool and for mixing with paints; and we do hereby declare that the following is a full and exact description thereof.

The manner of making said compound is as follows: Take a forty-gallon cask and put from forty to fifty pounds of lime therein. Pour into the cask soft water till the lime is nearly slaked. Then put in one pound of sulphur and a half pound of soapstone, or a pound and a half of sulphur without any soapstone. The proportions of these compounds may be varied. Fill the cask nearly full with water, and put therein from two to three pounds of prepared chalk and a half pound of calcined magnesia, and stir the mixture. Fill the cask with water, and it would be preferable to let it stand from twelve to twenty-four hours, so that it will soak and cut the sulphur well. The longer it stands the greater is the effect of the sulphur. After it has settled, draw off the water, which is then ready for use; or we may draw it off as we desire to use it.

This preparation may be used with an equal part of oil. The process must be such as described; but when oil is used the latter must not be mixed with the water until the water has been drawn off, and we have now a liquid perfectly smooth and clear from grit.

In the operation of slaking lime heat is evolved, and it is only when the lime-water is thus heated that the sulphur and soapstone can be made to mix intimately with it. The water thus prepared is apparently as pure and clean, as well as soft, as rain-water in its effects. Mixed with linseed-oil, it has the best effect in softening and spreading paints. It can be used with great advantage with oils for greasing wool, and also with oils in greasing mechanics' and machinists' tools at their manufactory, as it prevents both gumming and rust.

The compound (without the oil) requires to be cut or dissolved by and with hot lime-water, for while the lime is being slaked the heated water extracts the greasy and slippery nature from the materials of the compound and forms an intimate mixture with such extract. The compound thus formed, when mixed with oils or grease for lubricating machinery, should be in the proportion of equal parts of oil and the compound. When used with oil for greasing wool the proportion should vary. One part of oil and three parts of the solution would be about right for this latter purpose. The sulphur, prepared chalk, and magnesia, when thus mixed with lime-water, form a perfectly cooling mixture, in which both the sulphur and chalk are important agents.

The proportions cited are not imperative; nor is it absolutely necessary that all the materials of the compound should be used, but experience so far has shown them to be the best. In some cases the magnesia may be dispensed with, and in others the soapstone; but as a general rule they are used, as well as substances of like cooling properties of those enumerated in the compound.

For many purposes for which our compound is used other agents have been employed—such as alum, pot and pearl ashes, and soda-ash; but as these ingredients impart heat they are the opposite in their real effect from any thing we employ, and we entirely disclaim them.

We disclaim the use of the articles making part of our compound in a dry state, as also the use of lime-water with any other class of ingredients than those specified in this application; but

What we claim as our invention, and desire to secure by Letters Patent, is—

The cooling compound solution, as herein fully described.

HORACE VAUGHN.
WILLIAM HUTTON.

In presence of—
F. G. THOMAS,
GEO. C. THOMAS.